United States Patent [19]
Morimoto

[11] Patent Number: 4,999,244
[45] Date of Patent: Mar. 12, 1991

[54] COMPOSITE ORGANIC FILAMENTS

[75] Inventor: Shingo Morimoto, Omachi, Japan

[73] Assignee: Showa Denko Kabushiki Kaisha, Tokyo, Japan

[21] Appl. No.: 264,109

[22] Filed: Oct. 28, 1988

[30] Foreign Application Priority Data

Oct. 30, 1987 [JP] Japan ................................ 62-275508

[51] Int. Cl.⁵ .............................................. D02E 3/00
[52] U.S. Cl. ..................... 428/372; 428/364; 428/373; 428/379; 428/401; 524/413; 524/433; 524/443; 524/496
[58] Field of Search ............... 428/364, 372, 379, 401, 428/373; 524/413, 433, 496, 440, 504, 495, 443

[56] References Cited

U.S. PATENT DOCUMENTS

| | | | |
|---|---|---|---|
| 3,419,517 | 12/1968 | Hedrick et al. ...................... | 428/364 |
| 3,461,197 | 8/1969 | Lemelson ............................. | 264/172 |
| 4,011,193 | 3/1977 | Wambach ............................ | 524/413 |
| 4,442,254 | 4/1984 | Aratani ............................ | 524/496 X |
| 4,471,088 | 9/1984 | Chiba et al. ...................... | 524/433 X |
| 4,528,304 | 7/1985 | Yoshimura et al. ............. | 524/443 X |
| 4,599,383 | 7/1986 | Satoji ............................. | 524/495 X |
| 4,742,109 | 5/1988 | Takahashi et al. ................ | 524/504 |
| 4,761,445 | 8/1988 | Chiba ................................ | 524/265 |

FOREIGN PATENT DOCUMENTS 1251641 10/1971 United Kingdom ................ 524/496

Primary Examiner—Lorraine T. Kendell
Attorney, Agent, or Firm—Sughrue, Mion, Zinn, Macpeak & Seas

[57] ABSTRACT

A composite organic filament comprises an organic resin matrix and extrafine inorganic fiber-like segments having a diameter of 1 μm or less and uniformly distributed throughout the organic resin filament matrix. The composite filament has a diameter of 3 to 500 μm, and the fiber-like segments comprise carbon fibers produced by a vapor phase growth process and potassium titanate whiskers.

5 Claims, 1 Drawing Sheet (X 500)

(× 500)

(× 5000)

COMPOSITE ORGANIC FILAMENTS

BACKGROUND OF THE INVENTION

1. Field of the Invention

The present invention relates to composite organic filaments, and more particularly, to synthetic (organic resin) filaments reinforced with inorganic extrafine fiber-like segments.

According to the present invention, known extrafine fiber-like segments (e.g., whiskers) are distributed in an organic resin matrix and these materials formed into composite continuous filaments (threads) having a very small diameter, hitherto unobtainable. Each of the composite filaments has a superior strength, stiffness, electrical conductivity, thermal conductivity, sliding, and wear resistance properties. The composite filaments can be used in many fields, for example, spun and woven to form a textile or sheet, formed into a pre-impregnated reinforcement sheet, or cut into short filaments and mixed with resin, cement, and the like.

2. Description of the Related Art

Conventionally obtained fibers or composite fibers are hereinafter discussed in the light of the strength and electrical conductivity, for example, of the fibers. Carbon fibers made from PAN fibers or pitch are well-known as electric conductive fibers, and have a high electrical conductivity, i.e., a specific resistance ($\rho$) of 1500 to 2000 $\mu\Omega$cm. Since the conductivity increases in accordance with the level of graphitization of the carbon fiber, a specific resistance ($\rho$) of 800 to 1000 $\mu\Omega$cm can be attained. Furthermore, since the carbon fibers have a high strength and a high elastic modulus, they are widely used as a reinforcing material for, e.g., sports equipment such as golf clubs, fishing rods, and tennis rackets. Nevertheless, the production processes of the carbon fibers and carbon-fiber-reinforced products are complicated, and thus these fibers are very expensive.

Recently a method of cheaply and efficiently producing carbon fibers by a vapor phase growth process was developed. The carbon fibers produced by vapor phase growth (hereinafter called VGCF's) have superior mechanical properties, such as strength and elastic modulus, and a good electrical conductivity. The level of graphitization of the VGCF's can be increased to obtain a specific resistance ($\rho$) of 100 $\mu\Omega$cm or less and to improve the mechanical properties, but when the VGCF's are produced in a relatively short period, they have a diameter of less than 1 $\mu$m and a short length. If the diameter and length of the VGCF's are to be made thicker and longer, a long growth period is necessary which raises the production cost. Therefore, the vapor phase growth process can not economically produce thick and long carbon fibers suitable for practical use.

It is well-known that an electrically conductive powder (filler) such as metal powder and carbon black is mixed with an organic material (synthetic resin) to make the organic material conductive and then the organic material is spun into composite filaments, but the mechanical properties of the obtained filaments are inferior to those of the organic material without the filler. To obtain a practical electrical conductivity of the filaments, it is necessary to mix a large amount of the filler because the filler has a small aspect ratio, and as a result, the mechanical properties of the obtained filaments are reduced. If the carbon fibers made from PAN fibers or pitch are mixed into the organic material (resin) and then the organic material is spun into composite (carbon-fiber-reinforced) filaments, i.e., CFRP's, since each of the carbon fibers has a diameter of 10 $\mu$m or more, each of the composite filaments has a diameter of several tens of micrometers or more, and thus has a disadvantage of rigidity.

SUMMARY OF THE INVENTION

An object of the present invention is to provide composite organic filaments having superior properties such as strength and electrical conductivity, a suitably controlled diameter and length, and reduced production costs.

The above-mentioned and other objects of the present invention are attained by providing a composite organic filament comprising an organic resin matrix and extrafine inorganic fiber-like-segments having a diameter of 1 micrometer or less and distributed throughout the organic resin filament matrix.

BRIEF DESCRIPTION OF THE DRAWINGS

The present invention will be more apparent from the description of the preferred embodiments set forth below with reference to the accompanying drawings, in which.

DESCRIPTION OF THE PREFERRED EMBODIMENTS

Figure 1:
FIG. 1 is a scanning electron micrograph (x500) of a composite filament according to the present invention; and, FIG. 2 is a scanning electron micrograph (x5000) of a rupture cross-section of the composite filament of FIG. 1.

Experiments were carried out by the present inventor to obtain composite organic filaments having an improved strength and electrical conductivity by using extrafine fiber-like segments as a filler mixed with an organic material, and as a result, found that the VGCF's have a much higher electrical conductivity than that of carbon black, have good drape to general-purpose resin, and do not decrease a flowability of a resin containing the VGCF's, during injection molding. The present inventor also found that the resin containing the VGCF's can be easily spun to form filaments.

In the present invention, preferably conventional synthetic resins are used as the organic resin, for example, polyamides, such as nylon 6, nylon 11, nylon 66 and nylon 612; polyesters, such as polyethyleneterephthalate and polybutylene-terephthalate; polycarbonates, such as poly-bis-phenol A and carbonate; polyamide-imide; polyphenylene-sulfide; polyphenylene oxide; polysulfone; polyolefin; styrene resin; acryl resin; polyvinyl-chloride; polyvinylidene-chloride; and, polyvinyl-alcohol; or the like.

Also, preferably the extrafine inorganic fiber-like segments are extrafine VGCF's and/or potassium titanate whiskers.

Preferably, the VGCF's have a diameter of from 0.1 to 1.0 $\mu$m and a length of from 3 to 500 $\mu$m. Where the diameter of the VGCF's is less than 0.1 $\mu$m, a strength thereof is low, and where the diameter is more than 1.0 $\mu$m, the production costs become high, and therefore, the diameter of the composite filament is restricted. A length of the VGCF's of less than 3 $\mu$m does not remarkably improve the tensile strength of the composite filament, and a length of more than 500 $\mu$m increases the production costs.

Note, when potassium titanate whiskers are used to form the composite filaments, the strength and slidability of the filaments are improved, and it is possible to use the VGCF's and the potassium titanate whiskers in a combination thereof.

Preferably, 2 to 70 wt % (particularly, 10 to 50 wt %) of the extrafine fiber-like segments is mixed with the organic resin, and the mixture is formed into reinforced filaments by a conventional melt spinning, wet spinning or dry spinning method, depending on the resin used. Where the content of the segments is less than 2 wt %, the properties of the composite filaments are not improved, and where the content is more than 70 wt %, spinning becomes difficult. Of course, the segments must be uniformly distributed throughout the filaments.

During spinning, the obtained filaments may be subjected to a surface treatment, if necessary. Furthermore, the filaments may be drawn in the axial direction after the spinning, so that the fiber-like segments within the filaments are orientated, to increase the strength and electrical conductivity of the filaments.

Preferably, the diameter of the composite filaments is from 3 to 500 μm, more preferably 4 to 100 μm.

The present invention will now be further explained by way of examples.

EXAMPLE 1

Resin particles of polyethylene-terephthalate having a particle size of 10 to 500 μm were used, and carbon fibers were prepared by a vapor phase growth process and heat-treated at 2300° C. to increase the level of graphitization thereof. The vapor grown carbon fibers (VGCF's) had a diameter of 0.1 to 0.4 μm and an average length of 5 μm. Then 90 parts by weight of the resin particles and 10 parts by weight of the VGCF's were charged into a Henschel mixer and the agitating blades of the mixer were rotated to mix the VGCF's and resin particles, with the result that the VGCF's were adhered to surfaces of the resin particles. Some of the resin particles were fused together to form one body and included the VGCF's at the resin-particle interface. This mixing is disclosed in, e.g., Japanese Patent Application No. 62-81169 or U.S. Ser. No. 243959 filed on Sept. 14, 1988. The obtained particles were then charged into a spinning machine and melt-spun into composite filaments. The spinning conditions were as follows:

| Spinneret diameter | 100 μm |
| Spinneret shape | L/D = 2.5 |
| Discharge speed | 3 g/min |
| Spinning speed | 4000 m/min |
| Melting temperature | 240° C. |
| Extrusion pressure | 30 kg/cm$^2$ |

Figure 2:
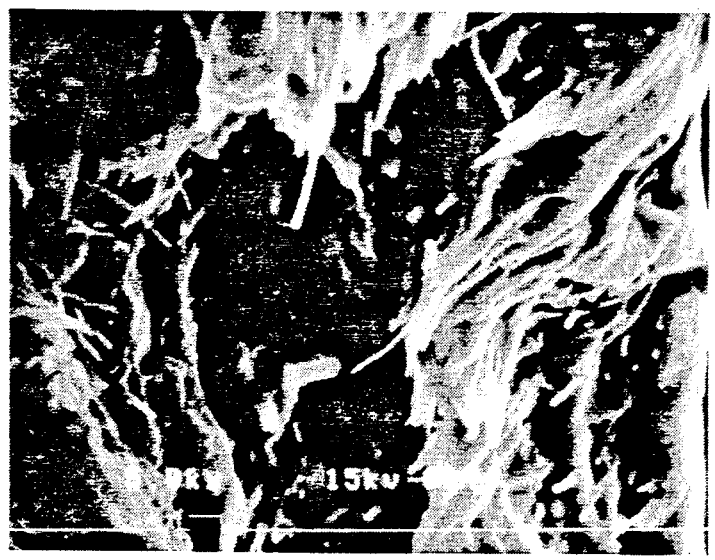

The spinning produced a long continuous composite filament having a diameter of about 40 μm, as shown in FIGS. 1 and 2. The produced filament had a specific resistance ($\rho$) of 100 Ωcm and a tensile strength (Ts) of 650 kg/cm$^2$, and the VGCF's were uniformly distributed throughout the resin matrix.

EXAMPLE 2

The VGCF's of Example 1 were used, with resin particles of polypropylene [Sho-allomer MA510 (MFI=12 g/10 min), trade name of Showa Denko Kabushiki Kaisha] having a particle size of 50 to 500 μm. Then 70 parts by weight of the resin particles and 30 parts by weight of the VGCF's were charged into and mixed in the Henschel mixer, and subsequently melt spun into composite filaments. The spinning conditions were as follows:

| Spinneret diameter | 100 μm |
| Spinneret shape | L/D = 2.5 |
| Discharge speed | 3 g/min |
| Spinning speed | 4000 m/min |
| Melting temperature | 230° C. |
| Extrusion pressure | 30 kg/cm$^2$ |

The spinning produced a long continuous composite filament having a diameter of 30 μm. The produced filament had a specific resistance ($\rho$) of 10 Ωcm and a tensile strength (Ts) of 1000 kg/cm$^2$.

EXAMPLE 3

In this Example, 50 parts by weight of the resin (polypropylene) particles and 50 parts by weight of the VGCF's used in Example 2 were mixed in the Henschel mixer and then melt spun by a spinning machine into composite filaments under the same conditions as those of Example 2, except that the discharge speed was 2 g/min, the spinning speed was 2000 m/min, and the extrusion pressure was 40 kg/cm$^2$, and as a result, a long continuous composite filament having a diameter of 32 μm was obtained. The obtained filament had a specific resistance ($\rho$) of 1 Ωcm and a tensile strength (Ts) of 1100 kg/cm$^2$. As is evident from these results, the increase of the VGCF's content remarkably increases the electrical conductivity and strength of the filaments.

EXAMPLE 4

In Example 4, 85 parts by weight of the resin (polypropylene) particles and 15 parts by weight of the VGCF's used in Example 2 were mixed in the Henschel mixer and then melt spun by a spinning machine into composite filaments under the same conditions as those of Example 2, except that the extrusion pressure was 20 kg/cm$^2$. Following the melt spinning, the filament was drawn at a draw ratio of 3 to obtain a long continuous composite filament having a diameter of 10 μm, a specific resistance ($\rho$) of 10 Ωcm, and a tensile strength (Ts) of 1300 kg/cm$^2$. In this case, the specific resistance value corresponds to that of the filament containing 30 wt % of the VGCF's of Example 2, and the tensile strength value is larger than that of the filament containing 50 wt % of the VGCF's of Example 3. These improved effects were obtained by further promoting the orientation of the VGCF's within the filament.

EXAMPLE 5

Potassium titanate whiskers having a diameter of 0.2 to 0.4 μm and a length of 5 to 15 μm were used. Accordingly, 70 parts by weight of the resin polypropylene particles, 15 parts by weight of the VGCF's used in Example 2, and 15 parts by weight of the potassium titanate whiskers were mixed in the Henschel mixer and then melt spun into composite filaments under the same conditions as those of Example 2, except that the extrusion pressure was 25 kg/cm$^2$. As a result of the spinning, a long continuous composite filament having a diameter of 28 μm, a specific resistance ($\rho$) of 100 Ωcm, and a tensile strength (Ts) of 1500 kg/cm$^2$ was obtained. Obviously, the addition of potassium titanate whiskers increased the strength of the filament.

EXAMPLE 6

The composite filaments obtained in Example 3 were cut (chopped) into short filaments having a length of 20 cm, and the short filaments were formed by a paper machine into a sheet having a thickness of about 300 μm and a weight per area of 70 g/m$^2$.

The obtained sheet was placed on a surface of a mortar plate and the electromagnetic shielding property of the plate was measured. The plate had an absorption ability of 30 to 35 dB at 1000 kHz to 100 MHz. Therefore, the sheet can be used as a material for preventing electromagnetic interference (EMI); for example, the sheet can be adhered to a plastic plate (box) of an electronic device.

EXAMPLE 7

A Leclanche type dry element battery uses $MnO_2$ as the positive pole active material thereof. Since $MnO_2$ has no electrical conductivity, usually acetylene black is mixed with the $MnO_2$. For example, 85 parts by weight of $MnO_2$, 10 parts by weight of acetylene black, and 5 parts by weight of binder (starch) were mixed in the Henschel mixer and then the mixture was formed under a compacting pressure of 10 kg/cm$^2$ into a compact body. The specific resistance of the compact body was 100 Ωcm.

The composite filaments obtained in Example 3 were cut (chopped) into short filaments having a length of about 3 mm, and the short filaments were used instead of a half of the amount of the acetylene black. Namely, 85 parts by weight of $MnO_2$, 5 parts by weight of the short composite filaments, 5 parts by weight of acetylene black, and 5 parts by weight of a binder (starch) were mixed and were compacted under the above-mentioned conditions to form another compact body. The obtained compact body had a specific resistance of 40 Ωcm lower than that of the former compact body. This shows that the addition of the composite filaments increased the electrical conductivity of the compact body.

As mentioned above, since the composite organic filaments were produced by using a conventional resin, inexpensive VGCF's and/or another extrafine fiber-like reinforcement material, and spun by a conventional spinning method, the obtained filaments can be cheaply produced, have an increased strength, and offer a wide selection range of filament diameters. The composite filaments according to the present invention can be used in various applications, e.g., as reinforcement material, prepreg sheet, and EMI shielding material.

It will be obvious that the present invention is not restricted to the above-mentioned embodiments and that many variations are possible for persons skilled in the art without departing from the scope of the invention.

I claim:

1. A composite organic filament comprising an organic resin matrix and 2 to 70 wt. % of extrafine fiber-like segments uniformly distributed throughout the organic resin matrix, wherein said extrafine fiber-like segments comprise carbon fibers produced by a vapor phase growth process, said carbon fibers having a diameter of from 0.1 to 1.0 micrometers and a length of from 3 to 500 micrometers and wherein said composite organic filament is produced by spinning said filament.

2. A composite organic filament according to claim 1, wherein said fibers are present at a content of 10 to 50 wt %.

3. A composite organic filament according to claim 1 wherein said filament has a diameter of 4 to 100 micrometers.

4. A composite organic filament according to claim 1, wherein said extrafine fiber-like segments comprise said carbon fibers and potassium titanate whiskers.

5. A composite organic filament according to claim 4, wherein said whiskers are present at a content of 10 to 50 wt %.

* * * * *